United States Patent [19]
Sproul, Sr.

[11] 3,738,014
[45] June 12, 1973

[54] FOOTBALL SIGHTING AND MEASURING DEVICE

[76] Inventor: Fred C. Sproul, Sr., 12227 Ranch House Road, San Diego, Calif. 92128

[22] Filed: Oct. 18, 1971

[21] Appl. No.: 190,229

[52] U.S. Cl. ............................................. 33/289
[51] Int. Cl. ............................................ G01c 5/00
[58] Field of Search ........................ 33/46 F, 289

[56] References Cited
UNITED STATES PATENTS

| | | |
|---|---|---|
| 2,795,853 | 6/1957 | Benfield, Jr. et al. ................. 33/46 F |
| 2,060,165 | 11/1936 | Borleske ............................ 33/46 F X |
| 2,900,727 | 8/1959 | Clime ................................ 33/46 F |
| 2,835,036 | 5/1958 | Peresenyi ......................... 33/46 F |

Primary Examiner—Robert B. Hull
Attorney—Allan R. Fowler, Louis J. Knobbe, Don W. Martens et al.

[57] ABSTRACT

A highly accurate football sighting and yardage measuring device for determining the field position of a football that eliminates the need for the traditional "chain gang," and effects substantial time savings by comparison. Yardage marker poles are positioned with the aid of attached elongate feet and a sighting scope, and provision is made for a ground-level metal track to ensure proper alignment of both the sighting scope and the marker poles relative to the sidelines and yardage lines of the playing field.

13 Claims, 9 Drawing Figures

INVENTOR.
FRED C. SPROUL, SR.
BY FOWLER, KNOBBE & MARTENS
ATTORNEYS.

PATENTED JUN 12 1973 3,738,014

INVENTOR.
FRED C. SPROUL, SR.
BY
FOWLER, KNOBBE
& MARTENS
ATTORNEYS.

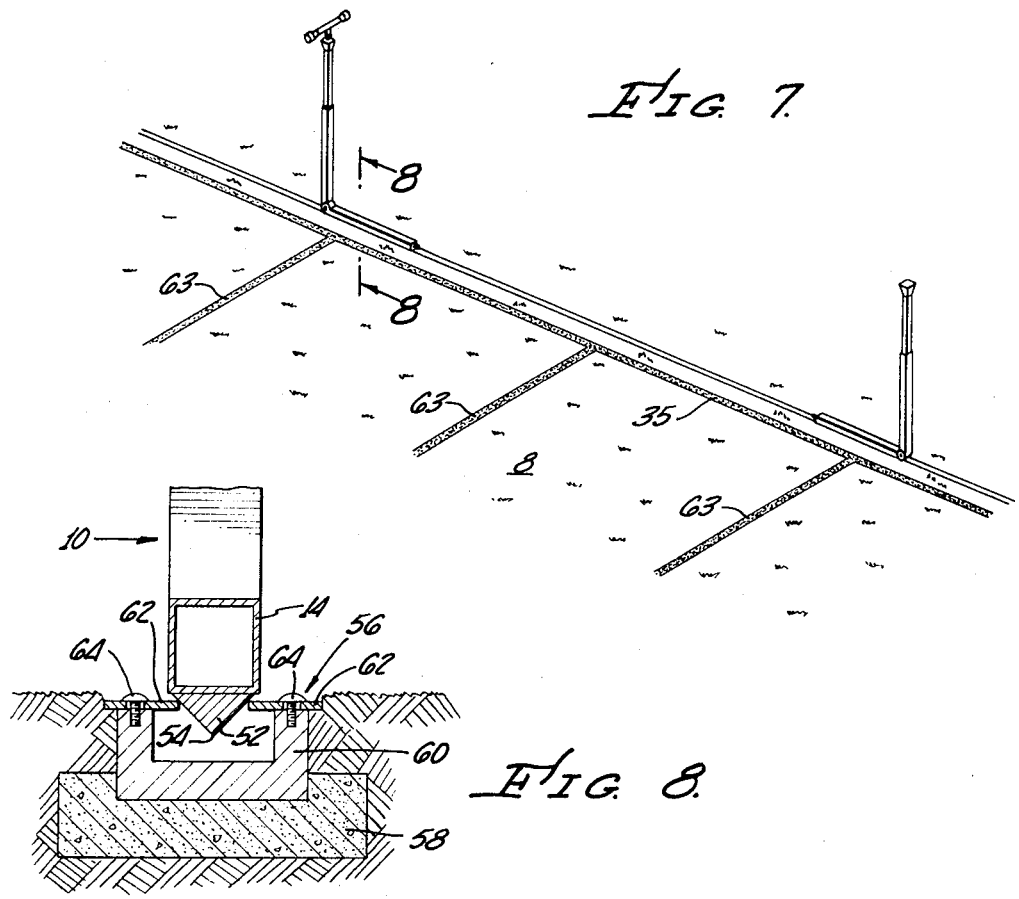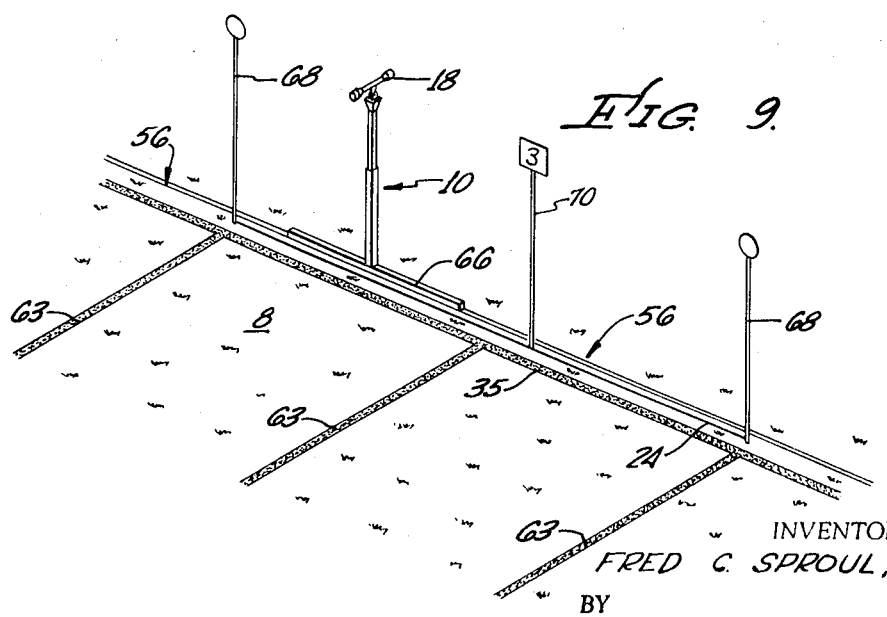

FOOTBALL SIGHTING AND MEASURING DEVICE

It has been standard practice for many years to measure yardage gained in a football game by a chain gang stationed at the side of a football field. The apparatus used traditionally consists of two metal poles which are held upright by respective officials and which are connected by a 10-yard length of chain at their bottom ends. Several problems are encountered with this arrangement. First, the difficulty of obtaining a precise positioning of the "index pole" (the pole which denotes the position of the ball at the beginning of a series of downs) with respect to the field position of the ball after a first down is gained, is usually dealt with by an approximation on the part of an official. The official gauges by eye the relative field position of the ball by noting its relationship to the yard stripes, and then attempts to position the index pole accordingly. The method is inherently inaccurate.

A second major problem is the inability of officials, using the present method of marking, to readily and accurately distinguish when a first down is deserved if the call is close. In such a case, an official normally grasps the chain where it crosses a yard line and the three officials—one holding each pole and one holding the chain—then trot onto the field and dispose the apparatus near the ball for the required measurement. Again, it should be emphasized that the method is manifestly inaccurate, and is additionally, wasteful of the time required for the procedure (which is often repeated many times throughout the course of a football game).

The present invention alleviates both of the above-described difficulties by providing a device with a sighting telescope, removably attachable to an upright pole, that enables an official positioned along a sideline to align the index pole of the apparatus quickly and accurately relative to the field position of the ball, principally by sighting on the ball through the telescope. Additionally, the present invention provides a novel apparatus, in the form of an elongate foot attached to the bottom end of the upright pole, which cooperates with means for ensuring the proper alignment of the sighting scope relative to the position of a football.

In the preferred embodiment of the present invention, two upright poles are used, each with an elongate foot for engaging a track laid parallel to and the same length as the football field. The track comprises an upward opening channel along which may easily slide the elongate feet. The upright poles are constrained, by a chain attached between the two elongate feet, to lie exactly 10 yards apart. A sighting scope is disposed atop one of the upright poles and constrained such that its line of sight is at all times perpendicular to the longitudinal axes of the elongate feet. Thus when the elongate feet lie parallel to the sideline (as when they are placed in engagement with the track), the sighting scope necessarily is directed perpendicularly thereto, as is required for the proper functioning of the present invention.

Atop both upright poles are receptacle means for removably retaining the sighting scope in operating position. The receptacle means are such as to allow extremely rapid engagement or disengagement of the scope so that it may be easily placed in position when required, and more importantly, so that it may be removed as quickly as possible when, for example, an onrush of players threatens the position of the officials and the apparatus at the side of the field. At such a time, it is contemplated that the sighting scope may be hastily removed and the remainder of the apparatus may be quickly laid down flat on the ground, thus protecting both the players and the apparatus itself.

An alternative embodiment is contemplated, wherein the longitudinal axes of the two elongate feet are constrained to be collinear and parallel to the sideline by the tension of a chain attached between them, and without the use of a track.

Another alternative embodiment is also described. In this embodiment only one upright pole and one elongate foot are utilized in conjunction with a track of the aforementioned type. Here, however, the traditional chain gang implements—namely, 2 yard marker poles spaced apart with the aid of a ten yard length of chain, and a down marker pole—are also employed.

These and other advantages of the present invention may be better understood with reference to the drawings, in which:

FIG. 7 is a perspective view of the preferred embodiment of the present invention in operative position on a football field;

FIG. 8 is a sectional view of the metal track of the present invention taken along line 8—8 of FIG. 7; and FIG. 9 is a perspective view of another embodiment of the present invention, also in operating position on a football field.

FIG. 1 depicts one embodiment of the present invention in operating position along the sideline of a football field. The same device is shown in much greater detail in the following figure, however, so reference will now be made primarily to FIG. 2.

Figure 2:
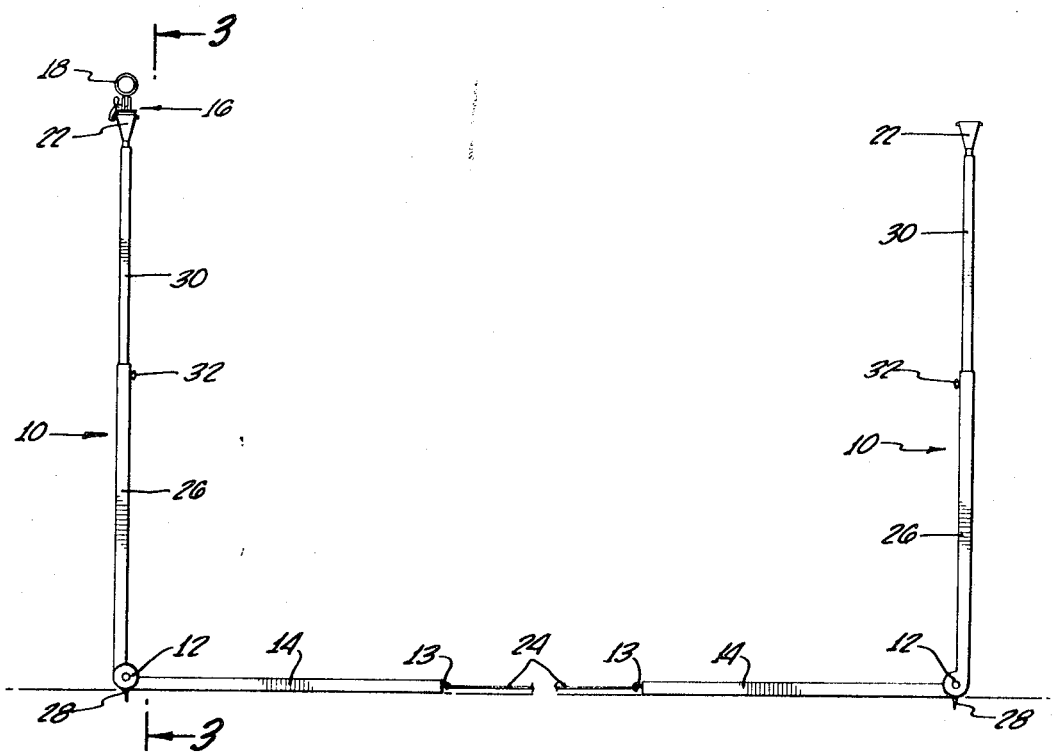
FIG. 2 is an elevation view of the first embodiment, also in upright position.

Shown in FIG. 2 are two upright poles 10, identical in design and appearance, to the respective bottom ends of which, by means of hinges 12, are attached elongate feet 14 adapted to lie flat along the ground and parallel to the sidelines. In use, the upright poles 10 are positioned complementarily so that the respective free ends 13 of the elongate feet 14 are directed toward one another. Latching means 16 are provided to rigidly retain sighting means which comprise a sighting telescope, or scope 18 on either of the two upstanding poles 10, as necessary for a particular direction of advance of the ball, such that the line of sight of the sighting scope 18 is constrained to be perpendicular to the longitudinal axis of the elongate foot 14. The latching means 16 further comprise, in the embodiments shown, a male means comprised of a truncated pyramid element 20 and a female means comprised of a mating receptacle 22 (see FIG. 4) suitable to rigidly, yet releasably, retain the truncated pyramid element 20, and hold the instrument against rotation after it is seated.

As stated above, the two upright poles 10, when in use, are disposed such that their respective elongate foot members 14 are directed toward one another. Attached to the free ends of the elongate feet 14 are respective ends of flexible, yet non-extensible connecting means, which in the preferred embodiment is a chain 24. When the two upright poles 10 are pulled apart to the full length of the chain 24, they are necessarily constrained at precisely 10 yards distance from each other, and will thus be spaced by the amount necessary to gain a first down in a football game. Further, the chain 24 interacts with the elongate feet 14 and upright poles 10, when stretched taut thereby, to rotate the upright poles 10 until the longitudinal axes of the elongate feet 14 coincide.

Figure 5:
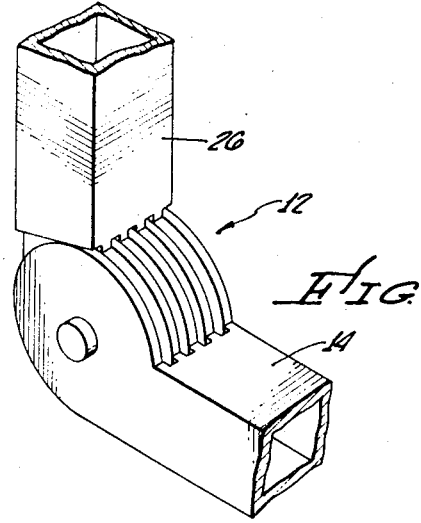
FIG. 5 is a broken-out perspective view of one of the hinges used to connect an upstanding pole with an elongate foot member.

Upstanding poles 10 are comprised of a plurality of straight, telescoping, tubular metal portions, which in the preferred embodiment are of square cross-section (FIG. 5). Integrally formed with the bottom end of the lower pole elements 26 are the hinges 12 and spikes 28. The spikes 28 serve to maintain the bottom ends of the upright poles 10 in correct position once placed by the operator. Upper pole elements 30 are of a smaller size than the lower pole elements 26 so that they may slide withoug excess play longitudinally within lower pole elements 26. Set screws 32 are provided for securing the upper pole elements 30 once the proper height adjustment is obtained for a given operator.

Figure 4:
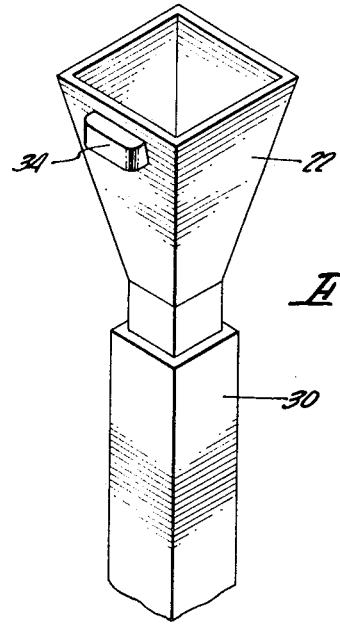
FIG. 4 is a partially exploded perspective view of the receptacle means of the poles and the attachment means of the sighting scope.

With reference to FIG. 4, there is shown in detail the preferred embodiment of the latching means 16 between the sighting scope 18 and the upstanding poles 10. Fixedly attached to the top of each of the upper pole elements 30 of the upright poles 10 are the receptacles 22 which, in the preferred embodiment, have the form of inverted, hollow truncated pyramids. Lugs 34, of substantially horizontal extent, protrude from two opposite sides of the receptacle 22 near the upper edges thereof. Their purpose is explained in the discussion below.

Again referring to FIG. 2, hingedly attached to the bottom ends of the lower pole elements 26 are elongate foot members 14, formed each of a single length of the same type of square metal tubing used to form the upstanding poles 10. The elongate feet 14, when unfolded to operating position, are disposed perpendicular to the line of sight of the sighting scope 18. Scope alignment may therefore be ensured simply by aligning correctly the elongate feet 14. This is accomplished by an official placing on the ground adjacent a sideline 35 the bottom end of the upright (index) pole 10 (as defined above). Another official then pulls the other upright pole 10 away from the index pole 10 until the chain 24 is taut therebetween and the two elongate feet 14 and the chain 24 all lie in the same straight line between the two upright poles 10. Finally, the second official then places on the ground the bottom end of the second upright pole 10 adjacent the sideline 35, and the same distance therefrom as the index pole 10, while simultaneously maintaining the tautness of the chain 24 and the relationship in which the two elongate feet 14 and the chain 24 all lie in the same straight line. Thus will the elongate feet 14 be constrained to lie parallel to the sideline 35, and the sighting scope 18 necessarily perpendicular thereto.

With reference to FIG. 5, there is shown a friction hinge 12 of a well-known type. The hinge 12 is preadjusted frictionally so that the elongate foot members may be folded flush against the side of the upstanding pole 10, and there be held firmly in place; or be unfolded for use, and be held firmly in the position at which set. The frictional adjustment should not be so harsh, however, as to preclude further adjustment by a game official without undue effort.

Again referring to FIG. 4, attached to the top of the pyramid element 20, so as to form the base of the pyramid, is a flat metal plate 36. The plate 36 in turn supports hinge means 38 for securing the sighting scope 18 to the pyramid element 20 such that the sighting scope 18 may be adjusted angularly about an axis perpendicular to the longitudinal axis of the scope 18 itself. The hinge means 38 allow the operator to sight on a football no matter how close the football to the football sighting and measuring device. The hinge means 38 are known in the art. Means (not shown) may be provided for adjusting the instrument on the element 20 to assure precise perpendicular alignment between the foot 14 and the instrument.

Also attached to the flat plate 36 is a spring-biased pawl 44 for mating with the appropriate one of the lugs 34 of the receptacle 22, thereby comprising latching means such that the truncated pyramid element 20 may be releasably, yet fixedly, retained in the receptacle 22. Lugs 34 are provided on two opposite sides of the receptacle 22 in order that the football measuring device can be used on either side of football field 8 without the necessity of reversing the respective upright poles 10. The two remaining sides of the receptacles 22 have no lugs so as to preclude incorrect attachment of the sighting scope 18.

Figure 6:
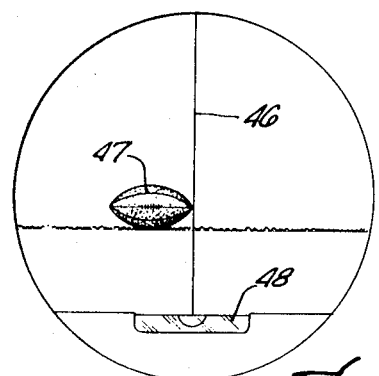
FIG. 6 is a representation of the view through the sighting scope.

FIG. 6 represents the field of view as seen through the sighting scope 18 when it is correctly aligned perpendicular to the sideline 35 and aimed toward the leading, or forward, tip of a football 47. The scope 18 is provided with a vertical hairline 46, which is placed substantially in the middle of the field of view; and level means comprising a bubble level 48 of the well known type, in such position that it may be utilized effectively by a scope operator sighting through the scope 18. The longitudinal axis of the bubble level 48 is disposed transverse to the longitudinal axis of the sighting scope 18 itself, for the sole purpose of determining when the upstanding pole lies within a vertical plane perpendicular to the sideline 35 of the field 8. With the bubble as shown in FIG. 6, this situation obtains. In this manner, the sighting scope 18 is used to position the respective upright pole 10 on a line perpendicular to the sideline 35 and indicative of the position of the football 47.

Figure 3:
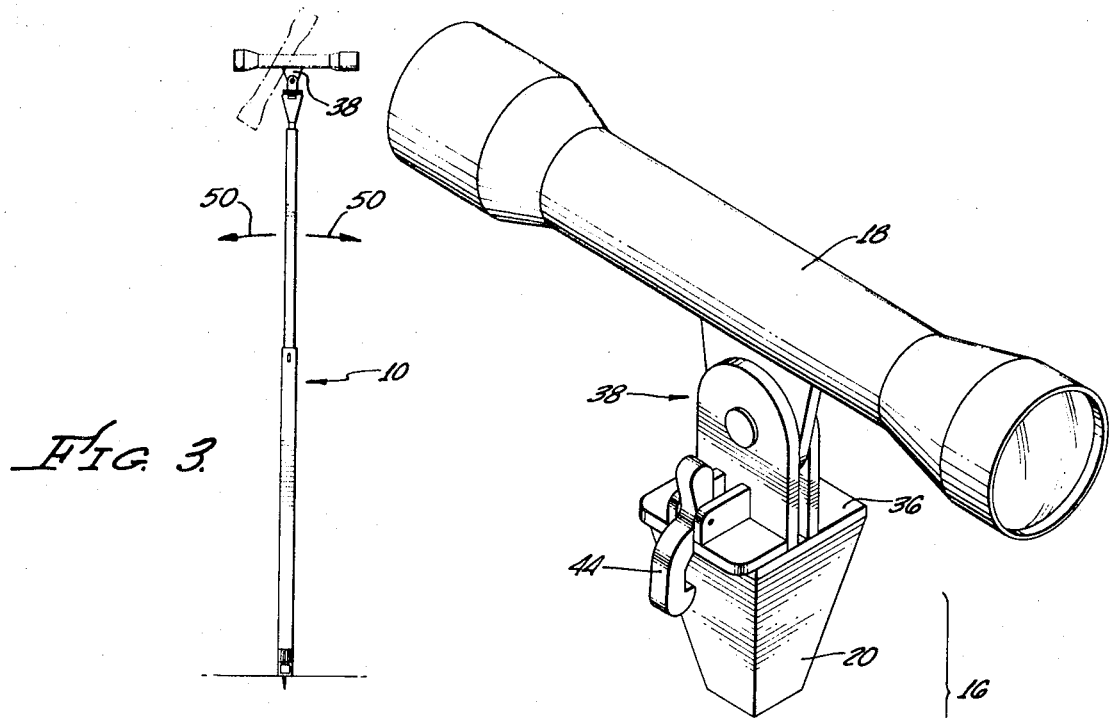
FIG. 3 is a side elevation view of one of the poles of the first embodiment.

FIG. 3 is included to display the rotatability of the sighting scope 18 through the action of the hinge means 38, and, with the aid of the arrows 50, to emphasize the fact that proper alignment dictates only that the upright pole 10 be aligned as discussed in the foregoing paragraph. The accuracy of measurement is unaffected by the angular position of the upright pole 10 about an axis parallel to the sideline 35. It is necessary only to ensure that the upright pole 10 is not angularly displaced from the vertical about an axis perpendicular to the sidelines, because such a displacement would mean that the sighting scope 18 was also displaced linearly along a parallel to the sideline 35. A resultant sighting would thus be inaccurate.

In the embodiment of FIG. 2, it would be possible to substitute a conventional yardage pole for one of the poles 10 such that only one of the two poles could accommodate the instrument. The pole which does not accommodate the instrument would not need a foot 14 as its rotational alignment would not matter.

Referring now to FIGS. 7 and 8, there is shown the preferred embodiment of the present invention, the description of which will employ similar reference numerals to denote similar elements. This embodiment of the invention is considered to possess the greatest degree of utility of the three embodiments herein described, and to be the most useful in practice. The elongate feet 14 are provided with means for slidably engaging the below-described track means, which engaging means comprise, in the preferred embodiment here shown, substantially triangular downwardly extending ribs 52 disposed along a substantial longitudinal portion thereof, having the free apex 54 of the triangle (as viewed in cross-section) pointed downward. Track means suitable for sliding engagement with the ribs 52 are indicated generally by reference numeral 56. The track 56 comprises a subterranean concrete foundation 58; a plurality of end-to-end aligned, upward opening metal channels, forming one continuous, uniform channel 60, and adjustable guide rails 62 suitable to slidably engage the downward extending ribs 52. The track 56 is disposed parallel to and a short distance beyond the sideline 35 of the football field 8 and is provided to constrain the elongate feet 14 to lie such that their longitudinal axes are parallel to the sideline 35 of the football field 8, thus ensuring that the sighting scope 18 is disposed perpendicular to the sideline 35 and hence parallel to the yardlines 63 of the football playing field 8.

In the preferred embodiment, the concrete foundation 58 is laid the entire length of the field. The channels 60 are secured fixedly therein, and the adjustable rails or plates 62, which are also disposed in an end-to-end manner, are comprised of elongate flat strips of metal, with a plurality of oversize screwholes additionally provided therein for the purpose of allowing slight adjustment with respect to the channel 60, into which the screws 64 are driven. Such adjustment means are necessary to compensate for possible imperfections in the formation of the channels 60 inherent in the manufacturing process, and which may be aggravated by imprecision in the laying of the channels 60 in the concrete foundation 58. Corresponding plates 62 on opposite sides of the channel 60 are adjusted such that the transverse spacing therebetween is somewhat less than the width of the base of the triangular ribs 52 to facilitate the desired sliding interaction. Thus the plates 62 are provided to maintain the trueness of the track with respect to a straight line parallel to the sidelines of the football field and to ensure an optimum fit with the ribs 52.

In operation during a game situation, two officials are required. When a first down has been gained, the apparatus is either slid or carried, depending upon the distance involved, to the approximate new location. If the ball has changed hands, the sighting scope 18 is moved to the other upright pole 10, which pole then becomes the index pole. Alternatively, two scopes can be used at all times, one on each pole. Regardless, the respective official then uses the sighting scope 18 to align the index pole with the leading tip of the football 47. The official maintaining the other upright pole 10 then pulls that other pole 10 along the track until the chain 24 is taut. This being accomplished, the football sighting and measuring device will be arrayed suitably to demarcate the 10 yard zone of the present series of downs. The sighting scope 18 is then moved to the other upright pole 10, that is, the one marking the attainment of a new first down for the team with the ball. By looking through the sighting scope 18 the respective official may readily ascertain when and if the team in possession of the ball has gained a first down, for once any part of the football 47 lies past the hairline 46, a first down is deserved.

A further embodiment of the present invention is illustrated in FIG. 9. Again, like reference numerals refer to like elements. Here only one upright pole 10 is used, and it is disposed with its bottom end rigidly connected to a single elongate foot 66 such that the upright pole 10 is perpendicular to the elongate foot 66, and the line of sight of the sighting scope 18 is also perpendicular to the elongate foot 66. The elongate foot 66 is also adapted to be disposed horizontally and is provided with a lengthwise-extending rib 52 for engagement with the track 56, in such a manner that the track 56 supports the elongate foot 66 and is mutually slidably engageable therewith.

Although sighting is still accomplished with the scope 18, in the embodiment of FIG. 9 the actual yardage marking is accomplished by two marker poles 68 and, in one mode of operation, a down-marker pole 70, of the type traditionally used by the chain gang, the two marker poles 68 being constrained as before by a nonextensible, 10-yard length of chain 24. The marker poles 68 and the chain 24 are utilized to measure the distance to a first down. The down-marker pole 70 is used to mark the location of the ball after each play and to indicate the number of the upcoming down.

At the beginning of a series of downs, the scope operator aligns the scope 18, and hence the upright pole 10, with the football 47. The scope operator then aids the other chain gang officials in aligning the appropriate one of the marker poles 68 and the down-marker pole 70 by sighting on the ball through the scope 18 and by ensuring that the marker poles are placed on the line of sight of the scope 18. The other marker pole 68 is then positioned 10 yards downfield as before. Once the marker poles are situated, the scope operator then moves the scope 18, still attached to the upright pole 10, to a position on the track at which the line of sight of the scope 18 passes through the downfield marker pole 68, and is therefore indicative of the new first down position which the team in possession of the ball is attempting to achieve.

This embodiment has the advantage of allowing the sighting scope 18 to be moved down the field to a new ball position immediately upon the completion of a play, while leaving the marker poles 68 and the down-marker pole 70 in place until such time as it is officially determined that, for example, no penalty occurred on the play and it is therefore judicious to move the marker poles 68 and the down-marker pole 70. Formerly, the chain gang would have to wait until a penalty determination had been made, because if the play was indeed called back, the proper position of the yardage marker poles might otherwise be lost. Thus the present arrangement results in yet another savings in time.

In a second mode of operation with the above-described single pole embodiment, no down-marker pole 70 is provided, and the upright pole 10 is used to mark the position of the ball at all times. This results in one less official being required, but it has the disadvantage that the sighting scope 18 may not be moved downfield to a new position until a penalty determination has been made.

FIG. 9 shows a rigid connection between the foot 66 and pole 10, rather than the use of a friction hinge 12. If the track is level and connection between the foot and pole is perpendicular, the friction hinge thus may be eliminated and the desired alignment still achieved. In that instance no bubble level 48 is required.

Figure 1:
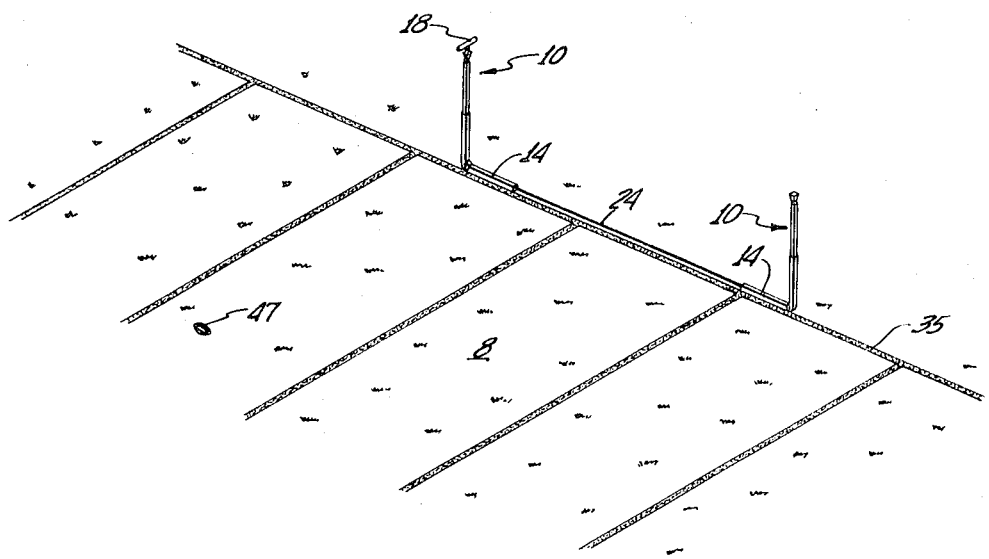
FIG. 1 is a perspective view of one embodiment of the present invention in operating position on a football field.

In either the embodiment of FIG. 7 or 9, the track may include indicia, e.g., on one of the guide rails 62, showing precisely the location along the field such as in yards, feet and inches corresponding to the yardage marker 63 on the field. In the embodiment of FIG. 1, a taut visible cable or tape can be immovably extended along the ground exactly parallel with the sideline marker to ensure that the two poles are aligned exactly parallel with the sideline of the field rather than relying on the less precise normal sideline marking. That cable or tape may include indicia as discussed above with reference to FIGS. 7 and 9.

I claim:

1. An apparatus for determining the field position of a football on a football field, comprising:
   an upright pole;
   an elongate foot attached to the bottom of said upright pole and adapted to lie flat along the ground when said upright pole is maintained in a vertical position and to have support from below involving frictional contact thereby to exhibit significant resistance to sliding movement of said foot and attached pole in a direction longitudinally of the elongate foot;
   a sighting scope;
   means for attaching said sighting scope to said upright pole such that the line of sight of said sighting scope is constrained to lie in a first vertical plane perpendicular to a second vertical plane containing said upright pole and the longitudinal axis of said elongate foot; and
   means for maintaining said elongate foot parallel to the sidelines of said football field.

2. The apparatus set forth in claim 1 wherein the means for maintaining said elongate foot parallel to the sidelines of the football field comprise:
   a second upright pole;
   non-extensible connecting means secured to the free end of said elongate foot and to the bottom of said second upright pole such that when said second upright pole is pulled away from said first mentioned upright pole and is placed with its bottom end on the ground adjacent the respective sideline and the same distance therefrom as said upright pole, the tautness of said connecting means positively aligns and maintains said elongate foot parallel to said sidelines and, therefore, the line of sight of said sighting scope perpendicular to said sideline.

3. The apparatus as set forth in claim 1 wherein the means for maintaining said elongate foot parallel to the sidelines of the football field comprise:
   a downwardly extending rib fixedly attached to the underside of said elongate foot and disposed along a substantial portion of the longitudinal length thereof; and
   an upwardly opening channel disposed along the entire length of the football field, parallel to the sidelines, and of such dimension as to slidably and frictionally engage said rib attached to said elongate foot on opposite sides of the centerline of the foot and throughout its length.

4. The apparatus of claim 3 wherein said rib has a triangular cross-section providing convergent lateral faces and said upwardly opening channel further comprises metal plates adjustably secured to the two upwardly extending portions of said upwardly opening channel to be engaged by the lateral faces of said rib, for the purposes of maintaining the trueness of the channel with respect to a straight line parallel to the sidelines of the football field and for ensuring an optimum fit with said rib of said elongate foot.

5. An apparatus for determining the field position of a football on a football field, comprising:
   an upright pole;
   an elongate foot attached to the bottom of said upright pole and adapted to lie flat along the ground when said upright pole is maintained in a vertical position;
   a sighting scope;
   means for attaching said sighting scope to said upright pole including a male means formed into the shape of a truncated pyramid and a female means comprised of a mating receptacle suitable to rigidly, yet releasably, engage said male means, one of said male and female means fixedly attached to said sighting scope and the other fixedly attached to said upright pole such that the line of sight of said sighting scope is constrained to be perpendicular to the longitudinal axis of said elongate foot; and
   means for maintaining said elongate foot parallel to the sidelines of said football field.

6. A device for aligning a sighting scope parallel to the yardlines of a football playing field, comprising:
   an upright pole;
   an elongate foot on said upright pole adapted to lie along the ground when said upright pole is in an upright operative position;
   a sighting scope attached to said upright pole such that the line of sight of said sighting scope is in a first vertical plane perpendicular to a second vertical plane containing said upright pole and the longitudinal axis of said elongate foot;
   track means extending the length of said football playing field and adapted to slidably engage said elongate foot and to constrain said elongate foot to lie such that its longitudinal axis is parallel to the sidelines of said football field, thus ensuring that said sighting scope is disposed perpendicular to the sidelines and hence parallel to the yardlines of said football playing field; and
   hinge means settable about an axis perpendicular to said second vertical plane for attaching said elongate foot to said pole to accommodate vertical positioning of the pole irrespective of deviations of the ground surface and/or the track from horizontality.

7. A device in accordance with claim 6 wherein:
   said hinge means has its pivotally interconnected components interengaged in frictionally resistant contactual relationship to offer significant resistance to changing of the angular relationship between said upright pole and its elongate foot.

8. A device in accordance with claim 6 wherein:

said hinge means accommodates pivotal folding movement of said foot into parallel relation to and surface contact with the side of said pole for purposes of transportation and storage of the pole; and said hinge means has its pivotally interconnected components interengaged in frictionally resistant contactual relationship for generally retaining said foot in surface engagement with the side of the pole otherwise then upon an intentional disengagement therefrom.

9. A device for accurately determining the position of a football and for measuring yardage during a football game, comprising:

an upright pole;

an elongate foot on said upright pole, said elongate foot adapted to lie on the ground to support said pole in an upright position;

sighting means for positioning said upright pole on a line perpendicular to the sidelines and indicative of the position of said football;

means for retaining said sighting means on said upright pole such that the longitudinal axis of said sighting means is in a first vertical plane perpendicular to a second vertical plane containing said upright pole and the longitudinal axis of said elongate foot; and hinge means settable about an axis perpendicular to said second vertical plane for attaching said elongate foot to said pole to accommodate vertical positioning of the pole irrespective of deviations of the ground surface from horizontality.

10. A device in accordance with claim 9 wherein:

said hinge means has its pivotally interconnected components interengaged in frictionally resistant contactual relationship to offer significant resistance to changing of the angular relationship between said upright pole and its elongate foot.

11. A device in accordance with claim 9 wherein:

said hinge means accommodates pivotal folding movement of said foot into parallel relation to and surface contact with the side of said pole for purposes of transportation and storage of the pole; and said hinge means has its pivotally interconnected components interengaged in frictionally resistant contactual relationship for generally retaining said foot in surface engagement with the side of the pole otherwise then upon an intentional disengagement therefrom.

12. A football sighting and measuring device, comprising:

first and second upright poles;

first and second elongate feet attached to the bottom ends of said first and second upright poles, respectively, said elongate feet adapted to lie flat on the ground in surface frictional contact therewith to afford significant resistance to sliding movement and with respective free ends thereof directed toward one another;

non-extensible connecting means attached to said free ends of said first and second elongate feet for constraining said upright poles from being pulled more than 10 yards apart, and when stretched taut for interacting with said upright poles thereby to rotate said upright poles until the longitudinal axes of said elongate feet coincide; and sighting means removably attachable selectively to either of said upright poles for positioning its sighting axis in a predetermined first vertical plane perpendicular to a second plane containing that upright pole and said longitudinal axes, which first vertical plane is indicative of the field position of a football.

13. A device for accurately determining the position of a football and for measuring yardage during a football game, comprising:

first and second upright poles;

track means, parallel to and extending the length of the sidelines of the football field;

first and second elongate feet attached to the bottom ends of said first and second upright poles, respectively, said elongate feet being provided with means for slidably and frictionally engaging said track means with significant frictional resistance to sliding movement of either foot and attached pole along said track;

non-extensible connecting means attached to said first and second elongate feet for constraining said upright poles from being pulled more than ten yards apart; and sighting means releasably attachable selectively to either of said upright poles for positioning the sighting axis in a first vertical plane perpendicular to a second vertical plane containing said upright poles and the longitudinal axes of said elongate feet.

* * * * *